United States Patent
Golowich et al.

(10) Patent No.: US 6,292,612 B1
(45) Date of Patent: Sep. 18, 2001

(54) MULTI-MODE OPTICAL FIBER HAVING IMPROVED REFRACTIVE INDEX PROFILE AND DEVICES COMPRISING SAME

(75) Inventors: Steven Eugene Golowich, New Providence; William Alfred Reed, Summit, both of NJ (US); Albert John Ritger, Lawrenceville, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/326,960

(22) Filed: Jun. 7, 1999

(51) Int. Cl.$^7$ .................................................. G02B 6/02
(52) U.S. Cl. .................... 385/124; 385/123; 385/126; 385/127
(58) Field of Search .................... 385/123, 124, 385/125, 126, 127

(56) References Cited

U.S. PATENT DOCUMENTS

| | | | | |
|---|---|---|---|---|
| 4,560,247 | * | 12/1985 | Aldebert | 385/123 |
| 5,013,131 | * | 5/1991 | Frotheringham | 385/123 |
| 5,729,645 | * | 3/1998 | Garito et al. | 385/127 |
| 5,940,567 | * | 8/1999 | Garito | 385/127 |
| 5,956,448 | * | 9/1999 | Smolka et al. | 385/124 |
| 6,078,715 | * | 6/2000 | Fujii et al. | 385/124 |

OTHER PUBLICATIONS

Geshiro et al., "Truncated Parabolic–Index Fiber with Minimum Mode Dispersion", *IEEE Transactions on Microwave Theory and Techniques.*, vol. MTT 26, No. 2, Feb. 1978 pp 115–119.

Okamoto et al., "Analysis of Wave Propagation in Optical Fibers Having Core with α–Power Refractive–Index Distribution and Uniform Cladding", *IEEE Transactions on Microwave Thery and Techniques*, vol. MTT–24, No. 7, Jul. 1976 pp 416–421.

Okamato et al., "Computer–Aided Synthesis of the Optimum Refractive–Index Profile for a Multimode Fiber", *IEEE Transactions on Microwave Theory and Techniques.*, vol. MTT 25, No. 3, Mar. 1977 pp 213–221.

* cited by examiner

Primary Examiner—Hemang Sanghavi
(74) *Attorney, Agent, or Firm*—Lowenstein Sandler PC

(57) ABSTRACT

A multi-mode optical fiber having an improved refractive index profile is disclosed. The refractive index profile is modified from a conventional by at least one of (i) a step formed in the index profile at the boundary of the core and cladding regions, in combination with a linear correction; (ii) a ripple near the core-cladding boundary, in combination with a linear correction, with or without an index step; and (iii) an annular ridge formed in the index profile of an α-profile with a center dip defect. The invention further relates to a communications system comprising the inventive fiber.

10 Claims, 5 Drawing Sheets

MULTI-MODE OPTICAL FIBER HAVING IMPROVED REFRACTIVE INDEX PROFILE AND DEVICES COMPRISING SAME

FIELD OF THE INVENTION

The present invention relates to a multi-mode optical fiber having an improved refractive index profile and to a communications system comprising the inventive fiber.

BACKGROUND OF THE INVENTION

Optical fibers are well known in the art and useful for many applications, including transmission laser devices and amplifiers. Basically, an optical fiber comprises an inner core fabricated from a dielectric material having a certain index of refraction and a cladding surrounding the core. The cladding is comprised of a material having a lower index of refraction than the core. As long as the refractive index of the core exceeds that of the cladding, a light beam propagated along the core exhibits total internal reflection, and it is guided along the length of the core. In most practical applications, the refractive indices of the core and cladding differ from each other by less than a few percent.

Designs for optical fibers vary depending upon the application, the desired mode of transmission of the light beam, or the materials used in fabrication. Fibers can be fabricated to propagate light with a single mode or multiple modes; an optical fiber which supports more than one guided mode is referred to as a multi-mode fiber. Multi-mode fibers typically have a larger core diameter than single-mode fibers to enable a larger number of modes to pass through the fiber. Additional design constraints are posed by multi-mode applications. Such constraints may include, for example, the choice of materials used to fabricate the core and cladding and the refractive index profile of the fiber (e.g., the profile reflects the radial variation in refractive index from the center of the fiber to the outer circumference of the cladding). Various types of refractive index profiles are known, e.g., step index, graded index, depressed clad, or W-type variety.

For high bandwidth, the group velocities of the various modes in multi-mode fibers should be as close to equal as possible. The differential group velocities can be controlled by grading the refractive index of the material comprising the core, which means specifying a functional form of the index as a function of the fiber radius. In a conventional multi-mode fiber, the design goal has been to achieve an α-profile, which is defined as:

$$\frac{n(r) - n_{clad}}{n(r)} = \Delta(1 - (r/r_{core})^\alpha),$$

where r is the radius of the fiber, $r_{core}$ is the radius of the core, $n_{clad}$ is the refractive index of the cladding, and α and Δ are free parameters. The optimal choice of parameters depends on the properties of the materials comprising the fiber and the intended application.

There are inherent limitations, however, in the α-class profiles, and manufacturing variables make it difficult, in practice, to achieve the theoretically optimal α-profile. For example, an inherent limitation with α-class profiles is that high order modes are not properly compensated (high order modes are those belonging to principle mode groups of high order; principle mode groups are groups of modes which propagate with nearly equal phase velocity, and the high order mode groups are those nearest to cutoff). Additionally, manufacturing variations can occur anywhere in the profile. With the two most frequently-used fabrication techniques, OVD and MCVD, anomalies are particularly problematic near the center of the fiber, i.e., anomalies occur near the center with greater frequency and magnitude than at other regions of the fiber. A common side effect of the MCVD process is a pronounced index depression, or dip, in the center of the fiber, which results in poorly compensated low order modes (i.e. those with small principle mode number). In other words, when a center dip is present the modes which have fields confined near to the central axis of the fiber have substantially different group velocities than the majority of the modes. Poorly compensated low order modes can dramatically affect fiber performance for certain applications, e.g. under launch from a semiconductor laser.

Efforts have been made to develop fiber index profiles to equalize high order modes in a multi-mode fiber and to compensate for the center dip. See Okamoto et al., "Computer-Aided Synthesis of the Optimum Refractive-Index Profile for a Multi-Mode Fiber," IEEE TRANS. MICROWAVE THEORY AND TECHNIQUES, Vol. MTT-25, No. 3 (March 1977), at p. 213 (incorporated herein) (hereinafter "Okamoto"). In Okamoto, a computer-aided synthesis is applied to develop an optimal profile, which is reported to be a smoothed W-shaped profile (e.g., FIG. 1 thereof). Essentially, this profile involves an extension of the alpha shape below the cladding (e.g., outside the core/cladding boundary region), with a negative cladding jump and then a further numerical refinement of the shape of the profile. See also Okamoto et al., "Analysis of Wave Propagation in Optical Fibers Having Core with α-Power Refractive-Index Distribution and Uniform Cladding," IEEE TRANS. MICROWAVE THEORY AND TECHNIQUES, Vol. MTT-24, No. 7 (July 1976), at p. 416 (incorporated herein), discussing use of numerical analysis to propose a similar profile. While such profiles may be advantageous in leading to high bandwidths, they are difficult to manufacture, and it is believed they may lead to leaky modes. In Geshiro et al., "Truncated Parabolic-Index Fiber with Minimum Mode Dispersion," IEEE TRANS. MICROWAVE THEORY AND TECHNIQUES, Vol. MTT-26, No. 2 (February 1978), at p. 115 (incorporated herein), a parabolic index profile is combined with a cladding jump, which leads to higher bandwidths than with a parabolic profile with no cladding jump. In a parabolic index profile, the core has a refractive index profile that has a parabolic distribution and is surrounded by a cladding having a constant refractive index.

As may be appreciated, those concerned with the development of optical communications systems continually search for new components and designs including new fiber designs. As optical communications systems become more advanced, there is growing interest in multi-mode fibers and increased fiber performance. The instant invention provides a multi-mode fiber having a refractive index profile that is relatively easy to manufacture and yet improves the behavior of high-order modes propagated by the fiber and compensates for the presence of a center dip, thereby improving the behavior of low order modes. Further advantages may appear more fully upon considering the description given below.

SUMMARY OF THE INVENTION

Applicants have discovered that a multi-mode fiber having increased performance may be made by modifying a conventional α-profile by (i) modifying the profile near the core-cladding boundary, to improve the behavior of high-order modes relative to that of an α-profile, and (ii) adding an index ridge near the center of the fiber to compensate for the presence of a center dip, thereby improving the behavior of the low-order modes. Gains in performance also may be achieved by modifying the profile with a ripple adjacent the core-cladding boundary.

BRIEF DESCRIPTION OF THE DRAWINGS

For a better understanding of the invention, an exemplary embodiment is described below, considered together with the accompanying drawings, in which.

It is to be understood that these drawings are for the purposes of illustrating the concepts of the invention and are not limiting in nature.

DETAILED DESCRIPTION OF THE INVENTION

This invention provides a multi-mode fiber having a refractive index profile that is relatively easy to manufacture, improves the behavior of high order modes propagated by the fiber, and compensates for the presence of a center dip, thereby improving the behavior of low order modes. To obtain the improved fiber, the conventional α-profile may be modified in at least one of three ways: (i) a step may be formed in the index profile at the boundary of the core and cladding regions, in combination with a linear correction; (ii) a ripple may be added near the core-cladding boundary, in combination with a linear correction, either with or without an index step; or (iii) an annular ridge may be formed in the index profile of an α-profile with a center dip defect. It is understood that these modifications may be made separately or in combination. For example, the annular ridge (iii) may be applied in combination with the step in the index profile (i), and/or in combination with the ripple (ii). The step (i) may be formed without the ripple, and the ripple (ii) may be formed without the step.

Figure 1A:
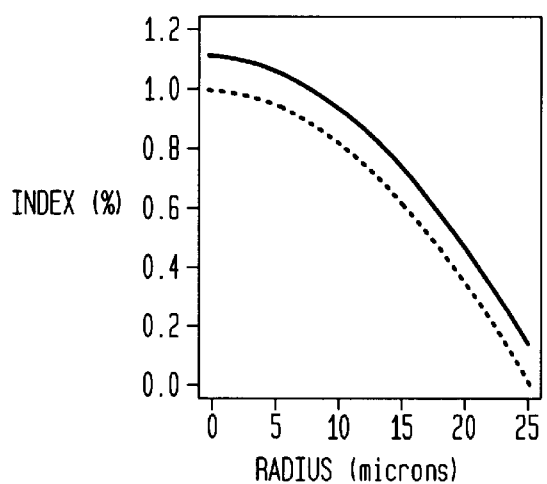
FIG. 1A shows a conventional optimal α-profile (dotted line) and a modified profile (solid line), where the modified profile has been formed by (i) adding a jump in the index at the boundary between the core and the cladding, and (ii) adding a linear correction to the index profile with the jump.
Figure 1B:
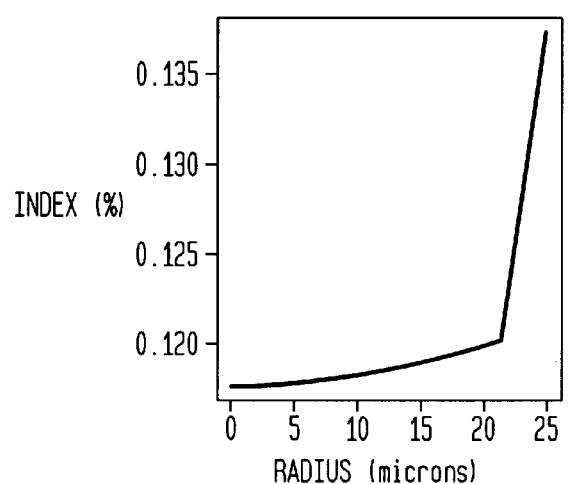
FIG. 1B shows the profile difference between the optimal α-profile and modified profile of FIG. 1A.
Figure 3A:
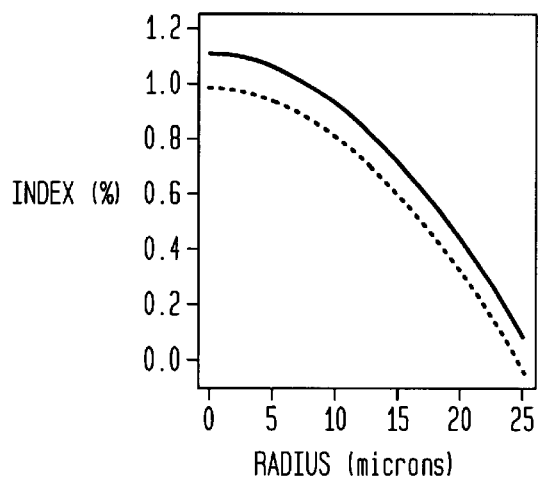
FIG. 3A shows a conventional optimal α profile (dotted line), and a modified profile formed as in FIG. 1A and with a small ripple introduced into the profile.
Figure 3B:
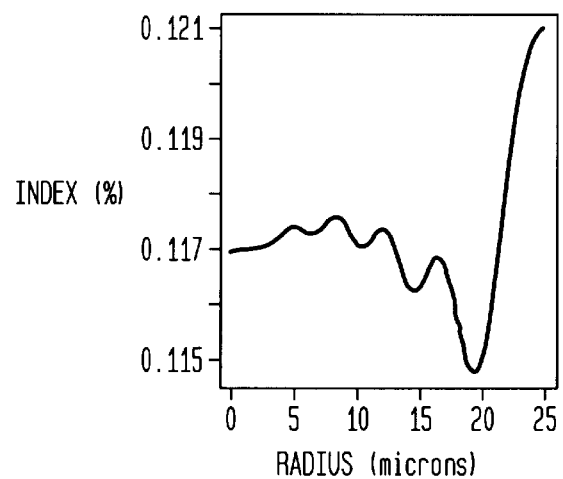
FIG. 3B shows the profile difference between the optimal profile and modified profile of FIG. 3A, illustrating the ripple introduced into the profile.

More particularly with reference to the figures, FIG. 1A shows a conventional optimal α-profile (dotted line) and a modified profile (solid line). Here, the modified profile has been formed by the first of the three options identified above, that is, a step has been added in the index at the boundary between the core and the cladding, and a linear correction was made to the index profile with the step. FIG. 1B shows the profile difference between the optimal α-profile and this modified profile of FIG. 1A. The gradual variation in index for radii below about 21 microns is an artifact of the particular definition of an α-profile used to generate the modified profile. It is well known in the art that this type of gradual index variation, which corresponds to a small change in $\Delta$ without significantly altering α, has little influence on the transmission properties of a fiber. FIG. 3A shows a conventional optimal α-profile (dotted line) and a modified profile (solid line) formed with both the first and second options referenced above. In other words, in FIG. 3A, the solid line reflects a fiber where a step has been added in the index at the boundary between the core and cladding, a linear correction has been added, and a small ripple has been introduced into the profile. FIG. 3B shows the profile difference between the optimal profile and modified profile of FIG. 3A, which particularly illustrates the ripple introduced into the profile.

Approaches for modifying profiles in order to improve the behavior of the high-order modes are known. For example, one may use a computer code to find the profile that optimizes a measure of predicted bandwidth, such as disclosed in Okamoto. The W-shaped profile Okamoto discloses, however, is difficult to manufacture and gives rise to a large number of undesirable leaky modes. In contrast, with the instant invention, perturbations are made to an α-profile to provide much of the benefits of the W-profile, while also being easy to manufacture and avoiding excess leaky modes.

The class of profile shapes according to the invention may be mathematically described. Mathematically, the class of profiles may be written as $$\frac{n(r) - n_{clad}}{n_{clad}} = \begin{cases} \Delta(1 - (r/r_{core})^\alpha) + J + f_{linear}(r, r_0) + f_{ripple}(r), & \text{if } r \leq r_{core} \\ 0, & \text{if } r > r_{core} \end{cases} \quad (1)$$

where $\Delta(1-(r/r_{core})^\alpha)$ is a conventional α-profile, J>0 is a step in index at the core-cladding boundary, $f_{ripple}(r)$ is described below, and $f_{linear}(r,r_0)$ is defined by $$f_{linear}(r, r_0) = \begin{cases} 0 & \text{if } r < r_o \\ m(r - r_0)/r_0 & \text{if } r \geq r_o \end{cases} \quad (2)$$

Equation (1) may be applied to achieve a plurality of profiles that approximately optimize the behavior of the high-order modes; in other words, there is a certain amount of freedom in the optimal design. A method by which one may arrive at a preferred design for a given application comprises the following steps: selecting the parameters $r_{core}$ and $\Delta$ of the $\alpha$-profile which is to be modified, along with a wavelength $\lambda$ at which the fiber will be operated; selecting a value of the index step J, which preferably is in the range of 0 to 0.5%; and then applying a computer code to obtain values for the parameters $r_0$ and m in Equation (2). A computer code that may be applied is described in T.A. Lenahan, Calculation of Modes in an Optical Fiber Using the Finite Element Method and Eispack, THE BELL SYSTEM TECHNICAL JOURNAL, 62(9):2663–2694 (1983) (hereinafter "Lenahan"), incorporated herein by reference. The factor $f_{ripple}$ can either be 0, or it may have a certain value for use in further optimizing the fiber performance.

Figure 5A:
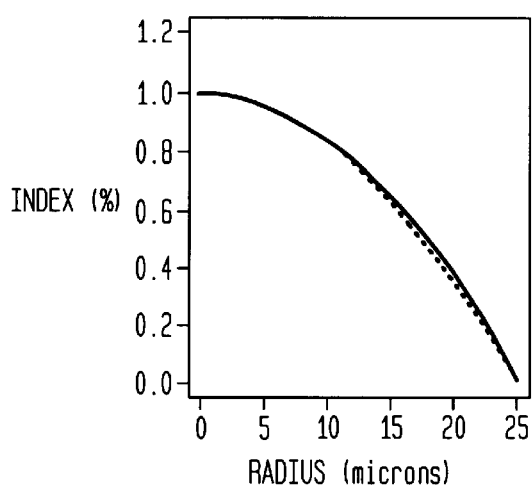
FIG. 5A shows a conventional optimal α-profile (dotted line), and a modified profile formed with a linear correction adjacent to the cladding and a small ripple introduced into the profile but without a cladding jump.
Figure 5B:
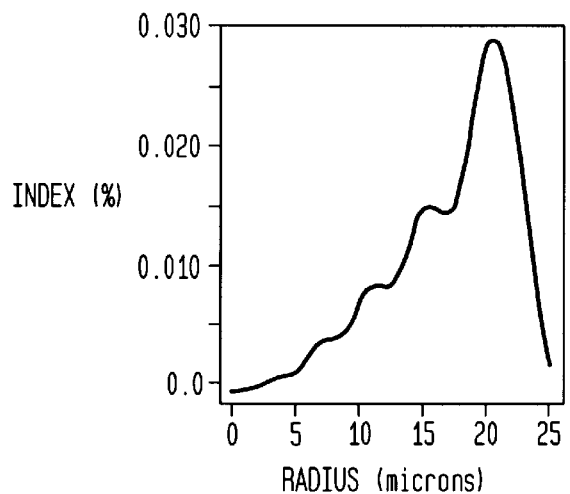
FIG. 5B shows the profile difference between the optimal profile and modified profile of FIG. 5A, illustrating the ripple introduced into the profile.

By way of example, the above method was applied to arrive at a preferred design for a fiber having a core comprising germania-doped silica surrounded by a cladding comprising pure silica. First, the parameters $r_{core}$ and $\Delta$ were selected, where $r_{core}$=25 $\mu$m and $\Delta$=1%, and the wavelength was selected to be $\lambda$=1.3 $\mu$m. Next, the value for the index step was selected to be J=0.12%. In this example, a computer code such as described in Lenahan was applied to obtain the optimal parameter values of $r_0$=0.85$r_{core}$ and m=0.0011. The value for $f_{ripple}$ was set at 0. The results of this procedure are reflected in the modified profile shown in FIGS. 1A and 1B. Further gains in bandwidth may be achieved by adding the additional term $f_{ripple}(r)$, the optimal value for which again may be determined with a computer code (the values of m and $r_0$ being redetermined as part of this optimization). The results of the procedure where the additional term $f_{ripple}(r)$ has been added are shown in FIGS. 3A–3B. The results of the procedure where the value for J is selected as 0 are shown in FIGS. 5A–5B. In FIGS. 5A–5B, a ripple has been added in addition to a linear correction near the core-cladding boundary, without an index step. FIG. 5A shows a conventional optimal $\alpha$-profile (dotted line), and a modified profile (solid line) formed with a linear correction adjacent to the cladding and with a small ripple introduced into the profile without a cladding jump; FIG. 5B shows the profile difference between the optimal profile and modified profile of FIG. 5A, illustrating the correction introduced into the profile.

Figure 2:
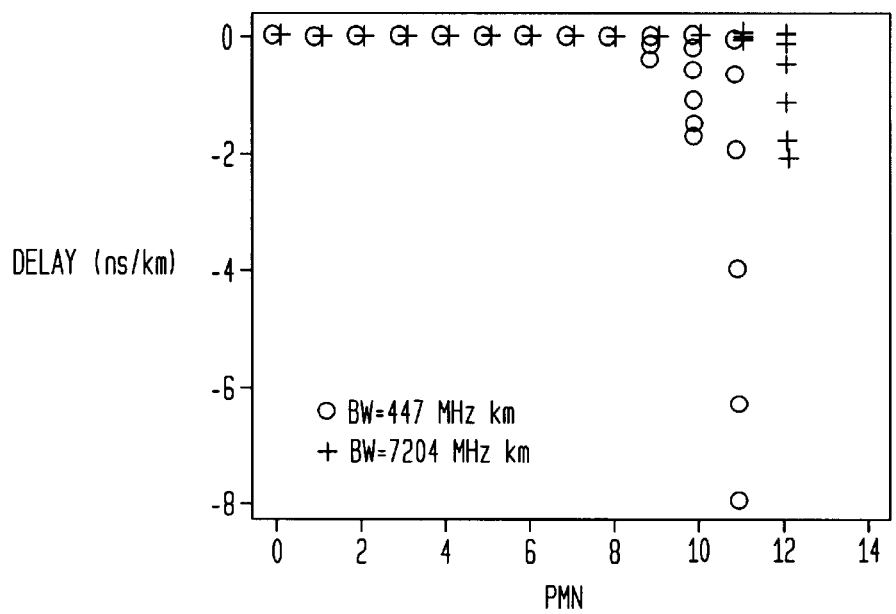
FIG. 2 displays the predicted modal delays of the two profiles shown in FIG. 1A.
Figure 4:
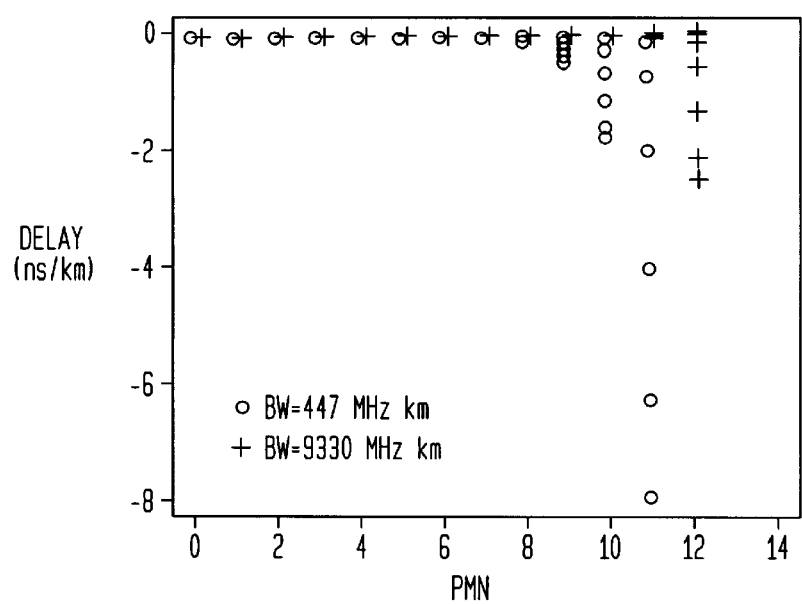
FIG. 4 displays the predicted modal delays of the two profiles shown in FIGS. 3A–3B, illustrating that additional gains in performance are obtained by modifying the profile with the ripple.
Figure 6:
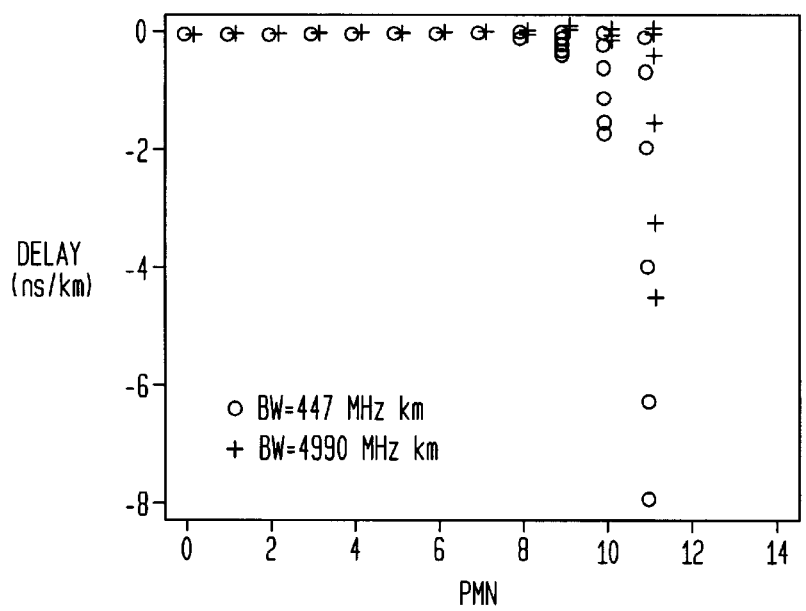
FIG. 6 displays the predicted modal delays of the two profiles shown in FIGS. 5A–5B, illustrating the gains in performance with the ripple.

The benefits of the modified index profile of the invention are illustrated in FIGS. 2, 4, and 6. These plots show the predicted modal delays of the fibers illustrated in FIGS. 1A–1B, 3A–3B, and 5A–5B, respectively. Modal delays are reported per km (i.e. the inverses of the group velocities of the various modes) as a function of principle mode number for a fiber having a modified profile (represented by +) and one having a conventional $\alpha$-profile (represented by o). Ideally, one would seek to achieve a fiber where all of the modes have equal delays. As can be seen in each of FIGS. 2, 4, and 6, the delays of the fiber having a modified profile (+) are more equal than those of a fiber having a conventional $\alpha$-profile (o).

The decreased spreading in the modal delays achieved with the modified profiles is advantageous for a number of reasons. For example, one advantage is that the overfilled bandwidths (included on the plots), are likely higher. Also, if the inventive fiber is used in a system comprising a laser launch with one or more connectors between fibers, the tolerances on the launch condition and the connectors may be more forgiving than if a fiber having a conventional profile were incorporated in the system. For instance, in certain applications the use of a conventional fiber may dictate that no light be coupled into the high-order modes, whereas with the inventive fiber this coupling may be present.

Figure 7A:
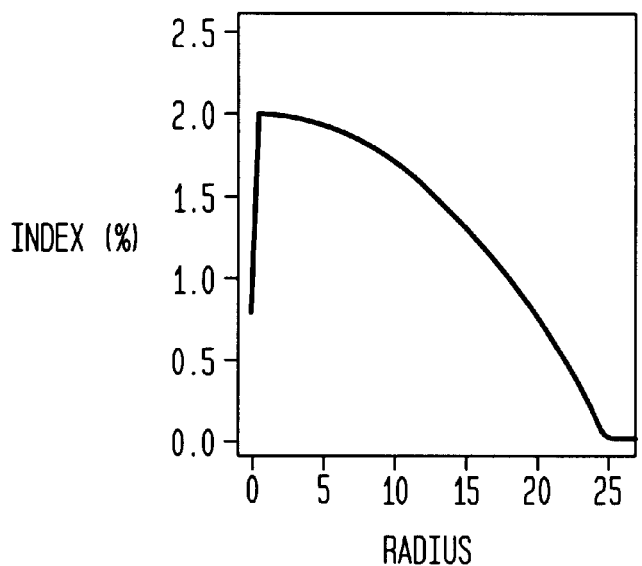
FIG. 7A shows a conventional α-profile with a center dip.
Figure 7B:
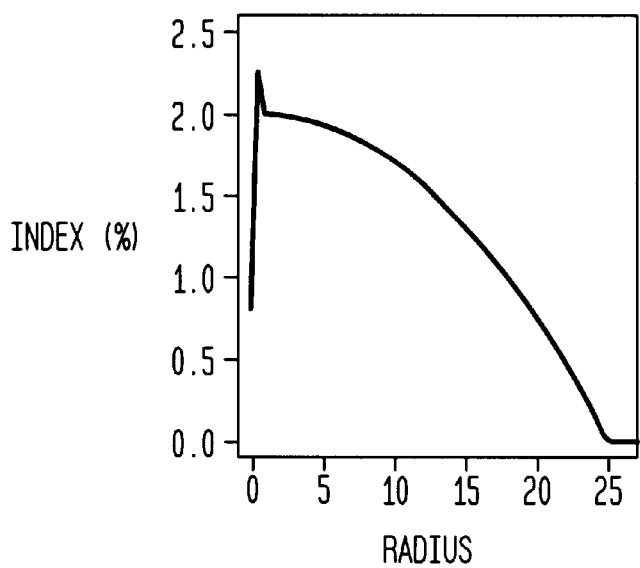
FIG. 7B shows an α-profile modified by adding an index ridge.

Another embodiment of the invention is shown in FIG. 7B, illustrating a modified profile comprising an index ridge proximal the center dip of a conventional $\alpha$-profile. This profile substantially improves the behavior of low order modes. Here, an index ridge is added proximal the center dip of a conventional $\alpha$-profile (shown for comparison in FIG. 7A). If the ridge and center dip are confined within a small percentage (e.g., about five percent) of the core radius, the group velocities of the modes of the fiber will be determined only by the integral of the index in the vicinity of the center, not on the detailed shape near the center. Thus, the shape near the center becomes less significant and the presence of a center dip has a lesser impact upon fiber performance. The radius below which the ridge must be confined will depend on the wavelength $\lambda$ transmitted by the fiber and the fiber design (e.g., materials comprising the core and the cladding, the diameter of the core and cladding, and other parameters). For example, the profile of FIG. 7B reflects a fiber having a core comprising germania doped silica surrounded by a cladding comprising pure silica for transmitting a wavelength $\lambda$ of about 850 nm. Here, the ridge is preferably disposed at a distance from the center that is within about four percentage of the core radius.

Figure 8A:
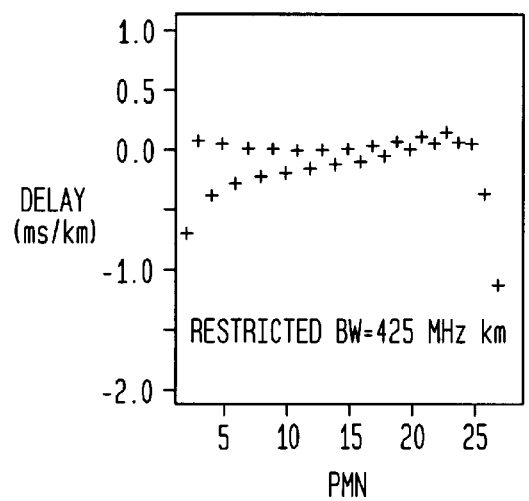
FIGS. 8A and 8B show modal delays of the two profiles shown in FIGS. 7A and 7B, respectively, demonstrating how poor low-order mode behavior caused by the presence of a center dip can be largely corrected by adding an index ridge near the center.
Figure 8B:
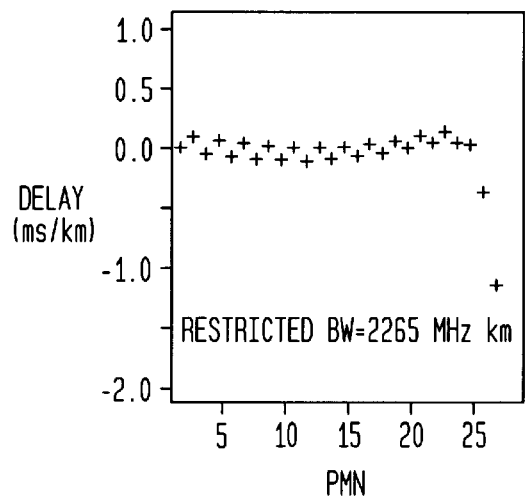

Benefits achieved with the modified index profile of FIG. 7B may also depend upon the height and width of the ridge profile. Preferably, the height and width of the ridge are selected to cancel the center dip in the sense that the total integral of the index in the vicinity of the center is equal to that of a pure $\alpha$-profile. The fiber then will exhibit the same properties as a fiber having a pure $\alpha$-profile. In general, the benefits will be greater as the radius to which the ridge is confined is decreased; i.e. preferably the ridge is confined as close to the center as possible. However, benefits also are obtained with wider ridges, for example, ridges confined to about 10–20% of the core radius, for typical multimode fiber designs. The total integral in the vicinity of the center is easier to control during manufacture than the precise configuration at the fiber center. Thus, with this modified profile a fiber having enhanced performance may be manufactured requiring less precision or controls during the manufacturing process. FIG. 8 illustrates the modal delays from the two profiles shown in FIGS. 7A–7B. As can be seen, the delays of the low-order modes of the fiber with the ridge have much less spread than those of the fiber with only a center dip. Hence, under launch conditions that excite only the low order modes, the bandwidth of the fiber with the ridge is much higher than that of the fiber without the ridge. For purposes of illustration, bandwidths have been predicted under the assumed launch condition of the first four principle mode groups excited.

It should be apparent to those skilled in the field that the presence of a central peak may be compensated with a trough in the same way that a center dip may be compensated with a ridge, as described above.

Figure 9:
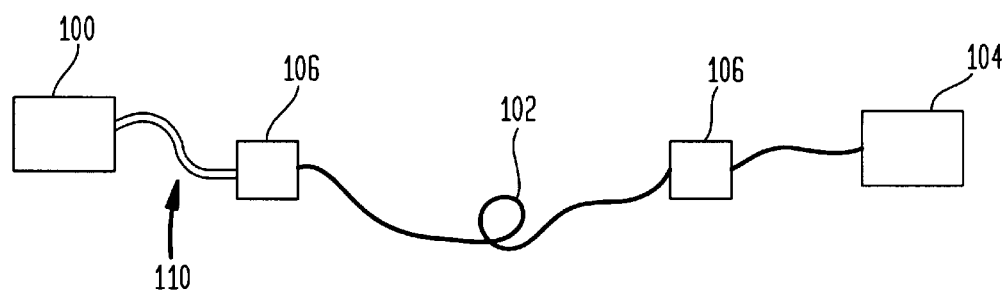
FIG. 9 schematically illustrates an optical communication system comprising the inventive fiber.

Referring to FIG. 9, it will be appreciated that the inventive fiber may comprise part of an optical fiber communication system that further comprises elements such as a transmitter 100, a receiver 104, and an optical path 102 connecting transmitter and receiver, possibly with one or more amplifiers 106, disposed along the optical path. The inventive fiber may be utilized throughout the optical path or at select regions of the optical path, e.g., section 110, and may be coupled with conventional fibers or devices.

It is understood that the embodiments described herein are merely exemplary and that a person skilled in the art may make variations and modifications without departing from the spirit and scope of the invention. All such variations and modifications are intended to be included within the scope of the appended claims.

We claim:

1. An article including a multi-mode optical fiber, the optical fiber comprising
   a core fabricated with a material having a predetermined refractive index;
   a cladding surrounding the core having a refractive index that differs from the refractive index of the core, the interface at which the cladding meets the core defining a boundary region,
   in which the core has a modified refractive index profile, the modified refractive index profile comprising an α-profile modified by at least one of (a) a step in the index adjacent the boundary region in combination with a linear correction; (b) a ripple adjacent the boundary region in combination with a linear correction; and (c) an index ridge adjacent the center of the fiber.

2. The article of claim 1, in which the modified refractive index profile comprises a step in the index adjacent the boundary region in combination with a linear correction and a ripple adjacent the boundary region.

3. The article of claim 1, in which the modified refractive index profile comprises a ripple adjacent the boundary region in combination with a linear correction without an index step.

4. The article of claim 1, in which the modified refractive index profile is defined by the equation, $$n(r) - n_{clad} = \Delta(r - r_{core})^\alpha + J + f_{linear}(r, r_0) + f_{ripple}(r), \text{ if } r \leq r_{core}$$

$$n(r) - n_{clad} = 0, \text{ if } r > r_{core}$$

where $\Delta(1-(r/r_{core})^\alpha)$ is a conventional α-profile, r is the radial coordinate measured from the center of the fiber, $r_{core}$ is the radius of the fiber core, $r_0$ is a free parameter referring to the radius beyond which a linear correction to the profile is applied, n(r) is the index of refraction as a function of radius, $n_{clad}$ is the index of refraction of the cladding, α is the numerical parameter in the α profile, J>0 is the step in index adjacent the boundary region, $f_{ripple}(r)$ is a parameter defining the ripple, and $f_{linear}(r,r_0)$ is defined by $$f_{linear}(r, r_0) = \begin{cases} 0 & \text{if } r < r_0 \\ m(r - r_0)/r_0 & \text{if } r \geq r_0. \end{cases}$$

5. An article including a multi-mode optical fiber, the optical fiber comprising
   a core fabricated with a material having a predetermined refractive index;
   a cladding surrounding the core having a refractive index that differs from the refractive index of the core, the interface at which the cladding meets the core defining a boundary region,
   in which the core has a modified refractive index profile having the shape of an α-profile modified by a step in the index adjacent the boundary region and a linear correction in the region where $r>r_0$ where $r_0 \geq 0.7 r_{core}$, r is the fiber radius, and $r_{core}$ is the radius of the fiber core.

6. The article of claim 5, in which the modified refractive index profile further comprises a ripple adjacent the core region.

7. An article including a multi-mode optical fiber, the optical fiber comprising
   a core having a define core radius and fabricated with a material having a predetermined refractive index;
   a cladding surrounding the core having a refractive index that differs from the refractive index of the core, in which a ridge or trough in the refractive index of the core is disposed within twenty percent of the radius of the core to compensate for the presence of a center dip or peak, respectively.

8. The article of claim 7, in which the ridge or trough is disposed within five percent of the radius of the core.

9. A system comprising a transmitter and a detector connected by one or more multimode fibers according to claim 1.

10. A system comprising a transmitter and a detector connected by one or more multimode fibers according to claim 5.

* * * * *